(No Model.)

N. H. BROWN.
GAS BURNING LAMP.

No. 566,055. Patented Aug. 18, 1896.

Witnesses:
Jas. C. Wobensmith,
Thomas M. Smith.

Inventor:
Nathaniel H. Brown,
By J. Walter Douglass
Attorney.

UNITED STATES PATENT OFFICE.

NATHANIEL H. BROWN, OF NORRISTOWN, PENNSYLVANIA, ASSIGNOR TO NATHANIEL H. BROWN, OF SAME PLACE, AND MORRIS EARLE AND HENRY S. WILLIAMS, OF PHILADELPHIA, PENNSYLVANIA.

GAS-BURNING LAMP.

SPECIFICATION forming part of Letters Patent No. 566,055, dated August 18, 1896.

Application filed November 15, 1895. Serial No. 569,005. (No model.)

*To all whom it may concern:*

Be it known that I, NATHANIEL H. BROWN, a citizen of the United States, residing at Norristown, in the county of Montgomery and State of Pennsylvania, have invented certain new and useful Improvements in Gas-Burning Lamps, of which the following is a specification.

My invention has relation to a lamp adapted for burning gas, for lanterns of the class known as "magic lanterns," for stereopticon purposes, and it relates to the construction of the lamp and arrangement of the parts thereof to adapt the same to the utilization of acetylene or similar gas therein.

The principal objects of my invention are, first, to provide a simple, reliable, and durable or strong lamp having burners connected therewith and arranged in the same longitudinal line to permit of a flame being derived therefrom of sufficient depth or body to permit of the use of acetylene or analogous gas for magic-lantern purposes; second, to provide a lamp in which the parts are arranged so as to permit of the adjustment of the same in different directions with respect to the supporting means of the lamp while still preserving the alinement of the burner-flames; and, third, to provide a lamp provided with burners arranged so that the flames will lie in parallel planes directly in alinement with each other, whereby acetylene gas or a gas of similar character may be utilized therein for deriving an intense flame, of sufficient luminous depth or body, without overheating or destruction of the burners or pipes thereof in a lamp especially adapted for stereopticon purposes.

My invention, stated in general terms, consists of a lamp constructed and arranged in substantially the manner hereinafter described and claimed.

The nature, characteristic features, and scope of my invention will be more fully understood from the following description, taken in connection with the accompanying drawings, forming part hereof, and in which—

Figure 1:
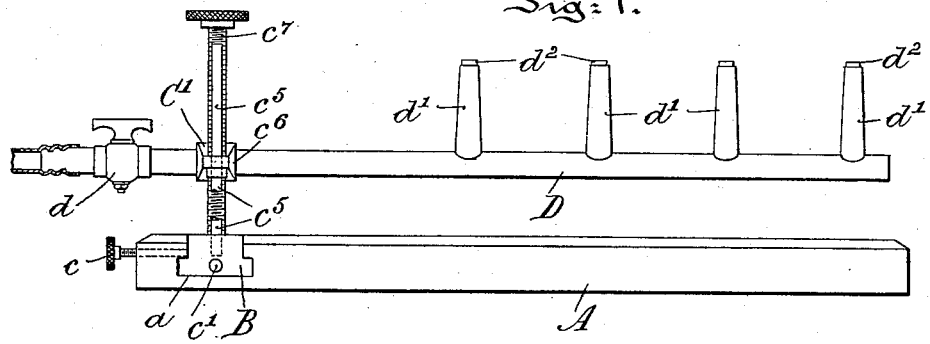
Figure 2:
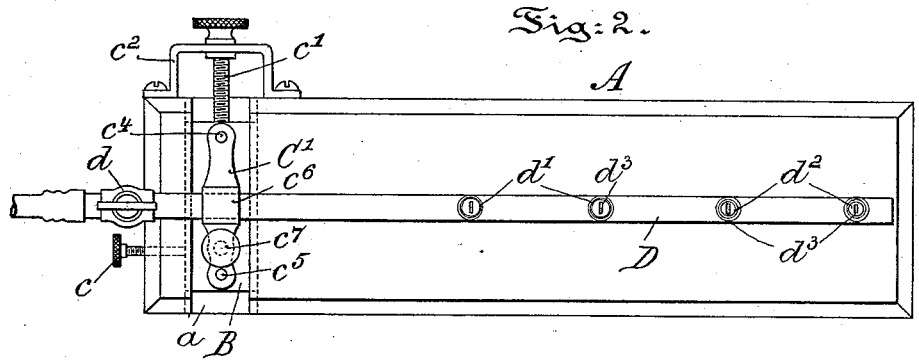
Figure 3:
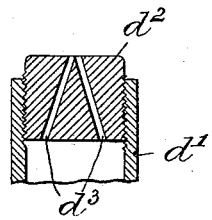
Figure 4:
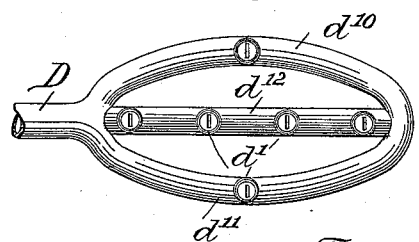
Figure 5:
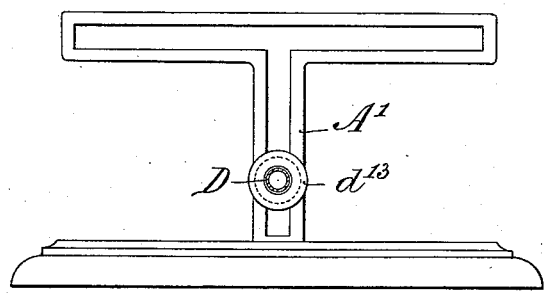
Figure 6:
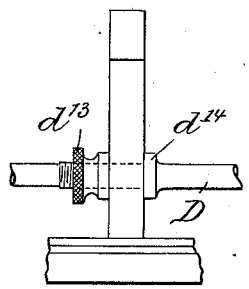

Figure 1 is a side elevation of a lamp in one form embodying features of my invention. Fig. 2 is a top or plan view of the lamp of Fig. 1. Fig. 3 is a central sectional view of a burner in broken section, showing the construction of the tips thereof. Fig. 4 is a modified form of arrangement of the burners of the lamp. Fig. 5 is an end elevational view of a modified form of the standard of the lamp, showing the manner of adjusting the burner in different directions; and Fig. 6 is a side elevational view in broken section of the modified form of standard for supporting the gas conduit or tube with its burners of Fig. 5, and illustrating the manner of adjusting the burner in different directions with respect to said standard.

Referring to the drawings with reference to Figs. 1 and 2, A represents a standard, into which, at or near one end, is inserted a recessed block B, fitting into a complemental recess $a$ of the standard A. The block B is held to place in the base A by means of a set-screw $c$ and rendered adjustable sidewise therein by means of a threaded operating-bolt $c'$, engaging through a bracket $c^2$ with one end of the block B and extending into the body of the same.

$c^4$ and $c^5$ are guides extending vertically from the block B and engaging a wing-bearer C', provided with a collar $c^6$ for fitting a pipe D, through which the gas flows to the burners, to be hereinafter more fully explained.

$c^7$ is a threaded hand-bolt extending through the wing-bearer C' and engaging the recessed block B for raising and lowering said pipe D. The pipe D is provided with a stop-cock $d$ for shutting off as well as permitting of the flow of acetylene gas or similar gas to the series of burners $d'$, inserted into openings provided therefor in the forward portion of the pipe D. These burners $d'$ are arranged in the same longitudinal line and are provided with flat tips $d^2$, set in the upper ends thereof, and with inverted-V-shaped internal wide channels $d^3$, leading from the base of said tips to the face, terminating in wide straight slits. Each of these slits is formed by boring out the body of the tip to produce such type of slit at the face end thereof, and so as to insure a flame thereat of sufficient volume to give the best possible results in the burning of acetylene gas in such a burner safely, and which is especially adapted for stereopticon uses, as clearly illustrated in Fig. 3. Upon the application of a match at the exposed end of the burner-tips, when the cock $d$ of the pipe D is turned so that there is a flow of the acetylene gas through the main D an intense flame will be produced at each of the burners, which, as shown in Figs. 1 and 2, are arranged at proper distances apart in a straight line, so that the flames will be parallel and adapted to give a combined luminosity of a sufficient body or depth which will be suitable for magic lanterns or similar purposes.

The burners $d'$ are provided with the flat-faced plugs $d^2$, so that by the intensity of the acetylene-gas-flame action therethrough these plugs will withstand the heat of said gas without deterioration or consumption, as practice has demonstrated, which would result from the burning of such gas in the ordinary type of burners; and, moreover, such form of burner-tip insures a greater volume of flame due to the increased surface or body thereof, and by reason of the depth of body of the said tip of the burner-tube $d'$ there is absolutely prevented any overheating of the same during extended acetylene-gas use of the burners for said purposes.

It will be observed from Figs. 1 and 2 that the adjustment of the block B laterally and of the pipe D vertically is controlled by means of the set-screw $c$ and threaded hand-operating-bolts $c'$ and $c^7$.

With reference to Fig. 4, it may be remarked that the construction of the burner is the same as that in Figs. 1 and 2, with the exception that the gas-conduit D has two connected branches $d^{10}$ and $d^{11}$ and a central tube $d^{12}$ from the main tube and uniting with the branches in which the burners in series are located, so that the flames of the two branches are parallel with the flames of the main or center branch and surround the same, to increase the intensity of the illumination derived from the burning of acetylene gas or the like in such a main or center branch which is of the general construction hereinbefore explained.

In Figs. 5 an 6 the standard A' is in the form of a T and slotted both vertically and transversely to permit of the adjustment of the gas conduit or pipe D vertically in the slot, as well as transversely, by loosening the milled set-screw $d^{13}$, movable on the pipe D and adapted to abut against the T-standard A', as clearly shown in Fig. 6 of the drawings, the pipe D being provided with a shoulder $d^{14}$, so as to abut against the front side of the standard A' when the nut $d^{13}$ is screwed on the threaded surface of said pipe and to place against said standard A'.

It may be here remarked that the use of acetylene gas is especially adapted, by reason of the brilliancy of flame or high degree of illumination that can be derived therefrom, for magic-lantern and other somewhat similar purposes, provided a sufficient luminous depth or body to the flame may be secured; but, owing to the heat-units of this gas as compared with ordinary gas, it has heretofore not been employed; and, moreover, it is essentially necessary that the parts of a lamp for burning such a gas shall be so arranged as to be capable of withstanding an intense heat as well as pressure, and that the burners shall be so located as not to be in such juxtaposition to one another as to cause a flame to be produced therefrom of such intimate union as to increase such heat to affect the burners, and by arranging the burners as illustrated in the drawings in the different forms of the lamp of my invention, the avoidance of burner consumption is insured and a reliable lamp obtained for deriving illumination therefrom for magic-lantern and many other purposes. Moreover, it is desirable to so arrange the lamp as that the parts shall be adjustable in different directions without disturbing the arrangement of the flames with respect to each other, so as to adapt the lamp to varying positions of the lantern or to be able to shift the flame with respect to the lantern to secure the best possible results in the illumination for stereopticon purposes.

Hitherto lamps in various types have been constructed, but generally with two gas conduits or pipes for the introduction of the elements constituting the gas through the lamp; but, as far as I am aware, it has not heretofore been possible to utilize a gas where high illuminating effects are absolutely required by the use of a single gas pipe or conduit in connection with a burner-lamp for the said purposes.

It will be manifestly obvious that as to minor details of the arrangement of the lamp with special reference to the character of burner, together with its tip, modifications may be made without departing from the spirit of my invention; and hence I do not wish to be understood as limiting myself to the precise construction and arrangement of all the parts of the lamp, as hereinbefore explained; but

Having thus described the nature and objects of my invention, what I claim as new, and desire to secure by Letters Patent, is—

The combination, in a lamp, of a pipe connected with a gas-supply, burners arranged in parallel planes and in alinement with each other, to permit of a flame being derived therefrom of sufficient depth or body to use acetylene or similar gas for stereopticon purposes, each of said burners provided with a solid flat plug or tip having inverted-V shape internal wide channels extending from the base of the plug or tip and terminating in the face in a straight wide slit, substantially as and for the purposes set forth.

In testimony whereof I have hereunto set my signature in the presence of two subscribing witnesses.

NATHANIEL H. BROWN.

Witnesses:
J. WALTER DOUGLASS,
THOMAS M. SMITH.